(12) United States Patent
Dargan

(10) Patent No.: US 8,195,448 B2
(45) Date of Patent: Jun. 5, 2012

(54) METHOD AND APPARATUS FOR PREDICTING TEXT

(76) Inventor: John Paisley Dargan, DeBary, FL (US)

( * ) Notice: Subject to any disclaimer, the term of this patent is extended or adjusted under 35 U.S.C. 154(b) by 1220 days.

(21) Appl. No.: 11/849,406

(22) Filed: Sep. 4, 2007

(65) Prior Publication Data

US 2008/0162113 A1    Jul. 3, 2008

Related U.S. Application Data

(60) Provisional application No. 60/896,918, filed on Mar. 24, 2007, provisional application No. 60/877,424, filed on Dec. 28, 2006.

(51) Int. Cl.
G06F 17/21 (2006.01)
G06F 17/28 (2006.01)
G06F 17/27 (2006.01)
G10L 15/04 (2006.01)
G10L 15/00 (2006.01)

(52) U.S. Cl. ....... 704/10; 704/4; 704/6; 704/9; 704/251; 704/257

(58) Field of Classification Search .................. 704/4, 6, 704/9, 10, 251, 257
See application file for complete search history.

(56) References Cited

U.S. PATENT DOCUMENTS

| | | | |
|---|---|---|---|
| 5,031,206 A | 7/1991 | Riskin | |
| 5,818,437 A | 10/1998 | Grover et al. | |
| 5,945,928 A | 8/1999 | Kushler et al. | |
| 5,953,541 A | 9/1999 | King et al. | |
| 6,005,495 A | 12/1999 | Connolly et al. | |
| 6,011,554 A | 1/2000 | King et al. | |
| 6,035,268 A * | 3/2000 | Carus et al. | 704/9 |
| 6,182,039 B1 * | 1/2001 | Rigazio et al. | 704/257 |
| 6,219,731 B1 | 4/2001 | Gutowitz | |
| 6,286,064 B1 | 9/2001 | King et al. | |
| 6,307,548 B1 | 10/2001 | Flinchem et al. | |
| 6,307,549 B1 | 10/2001 | King et al. | |
| 6,308,149 B1 * | 10/2001 | Gaussier et al. | 704/9 |
| 6,318,722 B1 * | 11/2001 | Shafer | 273/272 |
| 6,346,894 B1 | 2/2002 | Connolly et al. | |
| 6,493,670 B1 | 12/2002 | Croft | |
| 6,868,142 B2 | 3/2005 | Gupta et al. | |
| 6,910,012 B2 * | 6/2005 | Hartley et al. | 704/243 |
| 6,963,871 B1 * | 11/2005 | Hermansen et al. | 1/1 |
| 7,003,456 B2 * | 2/2006 | Gillick et al. | 704/235 |
| 7,197,449 B2 * | 3/2007 | Hu et al. | 704/9 |
| 7,590,536 B2 * | 9/2009 | Bates et al. | 704/244 |
| 8,036,893 B2 * | 10/2011 | Reich | 704/257 |
| 2002/0064257 A1 | 5/2002 | Denenberg et al. | |
| 2003/0083862 A1 * | 5/2003 | Hu et al. | 704/9 |

(Continued)

OTHER PUBLICATIONS

Appel, A.W. and Jacobson, G.J. "The World's Fastest Scrabble Program." Communications of the ACM 31, 5 (May 1988), 572-578.*

(Continued)

*Primary Examiner* — Douglas Godbold
*Assistant Examiner* — Edgar Guerra-Erazo
(74) *Attorney, Agent, or Firm* — Michael L. Leetzow, P.A.

(57) ABSTRACT

A method for text prediction for cell phone text messaging or for other applications. The preferred embodiment for predictive text involves the use of weighted positional digrams and a partial word dataset as well as optional elements involving three different types of voice recognition. Alternative embodiments involve the use of trigrams and quadgrams. The use of this text prediction system for a crossword game application is also described.

13 Claims, 8 Drawing Sheets

U.S. PATENT DOCUMENTS

| | | | | |
|---|---|---|---|---|
| 2004/0172258 | A1* | 9/2004 | Dominach et al. | 704/277 |
| 2005/0131687 | A1* | 6/2005 | Sorrentino | 704/235 |
| 2005/0188330 | A1* | 8/2005 | Griffin | 715/816 |
| 2006/0173678 | A1* | 8/2006 | Gilbert et al. | 704/233 |
| 2006/0175756 | A1* | 8/2006 | Watson | 273/272 |
| 2006/0265208 | A1* | 11/2006 | Assadollahi | 704/9 |
| 2006/0265648 | A1* | 11/2006 | Rainisto et al. | 715/534 |
| 2007/0083374 | A1* | 4/2007 | Bates et al. | 704/257 |
| 2007/0112554 | A1* | 5/2007 | Goradia | 704/4 |
| 2007/0233463 | A1* | 10/2007 | Sparre | 704/10 |
| 2007/0239637 | A1* | 10/2007 | Paek et al. | 706/20 |
| 2008/0033713 | A1* | 2/2008 | Brostrom | 704/9 |
| 2008/0126075 | A1* | 5/2008 | Thorn | 704/3 |
| 2009/0171662 | A1* | 7/2009 | Huang et al. | 704/251 |

OTHER PUBLICATIONS

Brian Sheppard, World-championship-caliber Scrabble, Artificial Intelligence, vol. 134, Issues 1-2, Jan. 2002, pp. 241-275.*

Gregory W. Lesher, et al.; Optical Character Arrangements for Ambiguous Keyboards; IEEE Transactions ion Rehabilitation Engineering; pp. 1-9.

John L. Arnott et al.; Probabilistic Character Disambiguation for Reduced Keyboards Using Small Text Samples; AAC Augmentative and Alternative Communication; pp. 215-223; Sep. 1992.

Richard A. Foulds et al.; Statistical Disambiguation of Multi-Character Keys Applied to Reduce Motor Requirements for Augmentative and Alternative Communication; AAC Augmentative and Alternative Communication; pp. 192-195; 1987.

Davis, James Raymond; Let Your Fingers do the Spelling: Implicit disambiguation of words spelled with the telephone keypad.

Mackenzie, I. S., Kober, H., Smith, D., Jones, T., Skepner, E. (2001). LetterWise: Prefix-based disambiguation for mobile text input. Proceedings of the ACM Symposium on User Interface Software and Technology—UIST 2001, pp. 111-120. New York: ACM.

Gutowitz, Howard; Barriers to Adoption of Dictionary-Base Text-Entry Methods: A Field Study.

Pavlovych, Andriy et al.; Model for non-Expert Text Entry Speeds on 12-Button Phone Keypads; Apr. 2004.

* cited by examiner

METHOD AND APPARATUS FOR PREDICTING TEXT

CROSS-REFERENCE TO RELATED APPLICATIONS

This application claims priority to and incorporates by reference herein in their entireties the following: U.S. Provisional Patent Application Ser. No. 60/896,918, filed Mar. 24, 2007 and U.S. Provisional Patent Application Ser. No. 60/877,424 filed Dec. 28, 2006.

FIELD OF THE INVENTION

The present invention relates generally to a method and apparatus for predicting text, and particularly to predicting text when at least one of the keys used to enter the text has more than one letter assigned thereto.

TECHNICAL BACKGROUND

Cell phone text messaging is a huge business worldwide, with many messages sent and received each year. Text messages are a convenience for the sender and the receiver. The sender can send the message silently and quickly, without worrying about having to play "phone tag" or risking interrupting someone with a phone call while they are driving or when they are in a meeting. The receiver can generally read the message at a glance and obtain important information in a silent, unobtrusive manner.

Text message services that allow groups of people to coordinate with one another via their cell phone and text messaging are becoming more widely available. The popularity of text messaging is likely to grow exponentially in the coming years as people discover how useful it can be. Text messaging is particularly helpful for people in a business environment who travel a lot and need to coordinate activities. For example, text messaging is particularly useful for government and nongovernmental agencies working together for disaster relief for purpose of coordinating their activities.

Cell phone text messaging is also a useful technique for allowing deaf people to communicate with their business associates, friends, and families. While it might seem counterintuitive for deaf people to carry cell phones, they can benefit greatly from being able to communicate through text messaging.

The currently popular systems used today for text entry on a cell phone, such as multi-tap and T9, have a number of disadvantages. The multi-tap approach, which involves a click, double-click, triple-click or even a quadruple-click of a key to indicate which letter on the key is intended by the user, involves two primary disadvantages: one is the excessive quantity of keystrokes for a given word and the other is the need for a timeout period between letters. So, for example, if you are entering the word "bars", then "2,2,<pause for timeout>" is entered for "b", then "2" is entered for "a", then "7,7,7<pause for timeout>" is entered for "r", then "7,7,7,7" is entered for "s"—a total of 10 key presses and two timeouts for a four-character word. An inexperienced user may think that he needs to wait for the timeout to expire with every key pressed, rather than just for the ones where two adjacent letters in a word both happen to fall on the same key. Thus, an inexperienced user might experience one timeout per key pressed. An experienced user would "barge" through the timeout when clicking a variety of keys, but he or she would have to consciously think about when the timeout period can be ignored and when it can't. The mental processing associated with determining whether or not to ignore the timeout interferes with the thought process involved in composing a message and causes some level of irritation in the user.

The T9 system (and others like it) involves words appearing on the display that are statistically likely to match the word being typed as the person taps one key per letter, but these words may or may not actually be the word intended by the user. Thus, you may be trying to send a message that your cat is stuck in a tree, but when you type the word "cat", the system may present "act" or "bat"—two other words that might match. When you are composing a message, your concentration may be challenged when words appear that are unrelated to the word you intend. The mental processing associated with trying to ignore the irrelevant words interferes with the thought process involved in composing a message and also causes irritation.

Other systems have been devised that allow the user to type a word on a one key per letter basis and to perform the disambiguation on a letter-by-letter basis. This type of data entry is easier, because it allows you to focus on your message and to only think about disambiguation when the need actually arises to provide a correction. For example, the Dennis Connolly/David H. Lundy patents (U.S. Pat. Nos. 6,346,894 and 6,005,495) discuss "a method and system for intelligent text entry on a keypad . . . " where the "application predicts which character of those corresponding to that key is [the character] intended by the user" and the user has an opportunity to select that letter or else cycle through the other letters on that same key in order to pick the one that is needed. These patents describe the idea of using sequences of letters (4-grams, n-grams) and their relative frequencies to determine the next most likely letter in relation to the pressing of a given key. They also describe the idea that the position of a word in relation to other words (verbs, prepositions, nouns, etc.) within a sentence can help determine the probability of the next word.

Unfortunately, the 4-gram approach alone does not provide as sophisticated an algorithm as may be needed in order to make the one-key-per-letter system as user-friendly and effective as possible. Furthermore, any system that provides statistical analysis of sequences of words (verbs, prepositions, nouns, etc.) is likely to be resource-intensive in terms of memory, data storage space and processing.

Below are examples of situations in which the 4-gram/n-gram approach can fail. The number "6" appears where an "m", "n" or "o" might be intended by the user after having already entered a number of letters.

Some examples include affecti6_: n or o (affecting/affection) and bisecti6_: n or o (bisecting/bisection); ambiti6_: o (ambition) and biti6$_{13}$ : n (biting); attracti6_: n or o (attracting/attraction) and acti6_: n or o (acting/action); eati6_: n (eating) and creati6_: n or o (creating or creation)

It can be observed from the examples above that knowing the four or even five letters that precede a given keystroke will not necessarily allow a computer program to be able to guess with certainty what the expected next character should be. In some cases knowing the entire first portion of the word helps, whereas in other cases the computer just has to make a statistically-based guess, because even then more than one word matches the entire first portion of the word.

The computer program can usually guess better when it matches a dataset with the entire first portion of the word that has been entered so far by the user. However, storing the entire word for all words in a given dictionary is expensive in terms of disk space, memory and processing time. A better approach is a hybrid approach in which a letter-position "multi-gram approach" is used for most situations and the word match approach is used for the more difficult words.

Depending upon the memory and storage of a given device, the letter-position "multi-gram approach" could use digrams for the majority of its letter predictions, and trigrams, 4-grams or longer letter sequences (also known as multi-grams) for the more ambiguous words.

The lists of words containing two-letter digrams below illustrate the concept that digrams have a variety of important positional and frequency characteristics in relation to words in a given language. In a manuscript, such as a novel, some digrams such as "er" are found in a high percentage of words and others are found in a very low percentage of words. Some of the words containing a given digram may be high-frequency words, such as "and" or "the," whereas others may be low frequency words, such as "aardvark." Some digrams are typically found at the beginning of a word, whereas others are typically found near the end, and others are sprinkled fairly evenly throughout the words in a text sample. The positioning of "cc" within a word is typically at the second and third letters (e.g., "accept") and sometimes at the third and forth letters (e.g., "success"). The listing below illustrates that positioning of "ff" within commonly-used words is very similar to the positioning of "cc". The positioning of "lu" is more likely to be toward the beginning or the middle of a word than at the end of a word. The letters "ou" are rarely found past the tenth letter of a word. Of course, letter sequences such as "es", "ing", "ly", "tion", "sion" and "ed" are often found at the end of a word. A disambiguation approach that uses this type of valuable digram-position information will be more successful than one that does not. The same point is also true of the positioning of trigrams, 4-grams or longer-length strings of letters.

Words that have a double "c" (such as cc) include accept, acceptable, accepted, accepting, accepts, accessible, accompany, accompany, according, account, accounted, accounts, accurate, accurately, accustomed, occasion, occasionally, occasions, occupied, succeed, succeeded, success, successful, and successfully.

Words that have a double "f" (such as ff) include affably, affected, affection, affirmative, affluence, afford, afforded, difference, different, difficulty, effect, effort, ineffectually, longsuffering, muff, muffle, muffled, off, offered, office, offices, official, officials, officiate, officiates, ruffled, ruffled, ruffles, ruffling, suffer, and sufficient.

Words that have an "lu" include absolute, absolutely, affluence, bluntly, blustering, clump, conclusive, delusion, failures, flung, flushed, flushed, including, luckless, ludicrous, ludicrously, luminous, lunch, luxuriant, luxurious, luxurious, luxuriously, luxury, luxury, luxury, reluctantly, resolute, resolutely, resolution, and volunteered.

Words that have an "ou" include about, account, accounted, accounting, accounts, ambitious, ambitiously, anxious, around, boundary, bounties, bountiful, bounty, brought, cautiously, commodious, confoundedly, contemptuously, cough, could, couldn't, counselors, course, courts, cousin, curiously, doubt, doubted, doubtfully, doubts, encounter, encountered, encountering, encounters, enough, enviously, espouse, fastidious, found, four, ground, grounds, hour, house, imperiously, incautiously, judicious, loud, louder, loudest, loudly, ludicrous, ludicrously, luminous, luxurious, luxuriously, malicious, mournfully, mouth, nouns, ominous, ominously, ought, our, out, outdoors, outside, playground, pour, profound, pronounced, proud, proudest, proudly, rapacious, rebellious, redoubtable, redoubtable, rough, roughly, round, should, shoulder, shoulders, soup, spacious, superstitious, tenacious, thorough, though, thought, thoughtfully, thoughts, thousands, through, touched, trouble, troubled, troubles, undoubtedly, victorious, vigorous, vigorously, virtuous, without, would, you, young, your, yours, yourself, and youth.

It is possible to perform statistical studies of words found in manuscripts of a given language using a computer program and to store the results in a format that another computer program can utilize via a decision tree, probability table or equivalent method in order to make predictions about what letter would typically follow the previously typed letters of a word. Then, as the user clicks on a given key on a reduced keypad (e.g., "2-ABC", "3-DEF", "4-GHI", "5-JKL", "6-MNO", "7-PQRS", "8-TUW", and "9-WXYZ"), the program can display the next likeliest letter.

Cell phones are limited in their computer memory, and thus designers of programs for cell phones are interested in finding ways to make their programs compact. A trade-off must be made between the desire for a compact disambiguation program and one that has the maximum possible level of effectiveness. Generally speaking, a 4-gram model would be less compact but more effective than a trigram model, and a trigram model would be less compact but more effective than a digram model. However, for purposes of trying to satisfy the programmatic goals of compact size and maximum effectiveness, a system can be devised that uses 4-grams (or even long portions of words) for particularly ambiguous sequences, trigrams for other sequences, and digrams for all of the rest. This approach can be described as a "multi-gram approach." The "multi-gram approach" is defined as the programming approach that uses statistical or empirical studies to determine the best combination of digrams, trigrams, 4-grams, long portions of words, etc., to meet the twin goals of compact program size and maximum program effectiveness. Thus, a "multi-gram" is a digram, trigram, 4-gram, n-gram or word portion that is used by an optimized program for the purpose of determining the most likely next character desired by a user when a multi-character key such as ("2-ABC") is pressed.

All of the foregoing paragraphs have discussed the technique of disambiguation in relation to pressing keys on a keypad. Another technique for adding words to messages could also be used in conjunction with pressing keys: voice recognition. According to the March 1988 edition of the Atlantic, 43 words account for half of the words that are used in normal conversation. Voice recognition works best with limited sets of words, particularly when used in a variety of environments (e.g., while on the sidewalk, in a car, in an office, in a restaurant, etc.). So, an optional feature for adding words to messages could be voice recognition of certain frequently-used words but not infrequently-used words. Such a device could have a default list of frequently-used words as well as an extra list of user-entered words. So, for example, if a particular college student frequently invites his friends over for pizza, then he could add "pizza" to his list of spoken words to be recognized. Thus, the user who wanted to employ this optional feature would alternate between keyed entry of words and voice recognition of words.

It would be desirable therefore to provide a method and apparatus that more reliably predicts a letter when a key is pressed that has two or more letters assigned thereto.

SUMMARY OF THE INVENTION

Disclosed herein is a method of predicting letters in a word being typed that includes the steps of considering a letter entered into a text receiving apparatus by a user by pressing a key on the text receiving apparatus, the text receiving apparatus having a plurality of keys to enter text and at least one of the plurality of keys having at least two letters assigned thereto, providing a partial word list, the partial word list having a predetermined number of portions of words and at least one following letter associated with each word portion, each of the word portions comprising at least two letters and including the first letter of each of the word portions, comparing at least one letter previously entered into the text receiving apparatus with the partial word list, suggesting the at least one following letter to be added to the at least one previously entered letter based on the partial word list and the pressed key when the at least one previously entered letter is present in the partial word list, and repeating the steps as necessary until the word is complete.

In another aspect, a method of preparing a set of digrams to be used with a letter predicting application for use with text messaging that includes the steps of selecting a text sample, the text sample having at least a predetermined number of words, synthesizing a set of digrams from the text sample, each of the digrams comprising a combination of two consecutive letters, each of the digrams having associated therewith a frequency of occurrences in the text sample based on a position of the digram within the words in the text sample, and storing the set of digrams in a readable memory.

In yet another aspect, disclosed herein is a method of predicting letters in a word being typed that includes the steps of providing a partial word list, the partial word list having a predetermined number of portions of words and at least one following letter associated with each word portion, each of the word portions comprising at least two letters and including the first letter of the word and providing a set of digrams, the digrams comprising two letter combinations, each of the digrams having assigned a value representing a frequency of occurrence in a given word based on a location of the digram in the word being typed. The method also includes considering at least one letter previously entered into a text messaging apparatus by a user, the text messaging apparatus having a plurality of keys to enter text and at least one of the plurality of keys having at least two letters assigned thereto and suggesting at least one following letter to be added to the at least one previously entered letter of a word entered by a user based on the partial word list when the at least one previously entered letter of a word is present in the partial word list. Finally, the method includes suggesting a following letter that would come after the previously entered letter from the list of digrams when the at least one previously entered letter is not present in the partial word list, the suggested following letter being suggested based on the pressed key and also on a location of the at least one previously entered letter and the suggested letter in the word and frequency of the occurrence of a resulting digram of the at least one previously entered letter and suggested letter in the location in the word being typed, and repeating the steps as necessary until the word is complete.

In yet another aspect, disclosed herein is a method of playing an electronic crossword puzzle on an electronic device, the electronic device having a display and a plurality of keys for entering letters into the electronic device, at least one of the plurality of keys for entering letters having at least two letters associated therewith, the method including the steps of displaying at least a portion of the electronic crossword puzzle on a display, the portion of the crossword puzzle having at least one vertical column and at least one horizontal row, displaying a complete word in one of the at least one vertical column and the at least one horizontal row and having an incomplete word in the other column, positioning a cursor at an open letter position for the incomplete word, displaying on the display a clue for the incomplete word, displaying at the position of the cursor a letter associated with a key pressed by the user, the displayed letter being selected from letters associated with the pressed key and based on a predetermined list of letter combinations, and moving the cursor to the next open letter position.

Also disclosed herein is an electronic apparatus for playing an electronic game of crossword that includes a system processor, the system processor including a central processing unit and a memory device for storing system software, a user interface that includes a plurality of keys, at least a portion of which have at least two letters assigned thereto, the keys also being used to input commands to the system processor, a display interface with and controlled by the system processor to display information about the electronic game, at least a portion of a crossword puzzle, the portion of the crossword puzzle having at least one vertical column and at least one horizontal row and having a complete word in one of the at least one vertical column and the at least one horizontal row and having an incomplete word in the other column, letters being inputted by the user into open spaces in the portion of the crossword puzzle, and a predetermined list of letter combinations stored in the memory device to be used as crossword puzzle answer to match letters to be input into the open spaces in the portion of the crossword puzzle based on the letters assigned to the key pressed by the user.

Additional features and advantages of the invention will be set forth in the detailed description which follows, and will be readily apparent to those skilled in the art from that description or recognized by practicing the invention as described herein, including the detailed description which follows the claims, as well as the appended drawings.

It is to be understood that both the foregoing general description and the following detailed description of the present embodiments of the invention are exemplary and explanatory, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
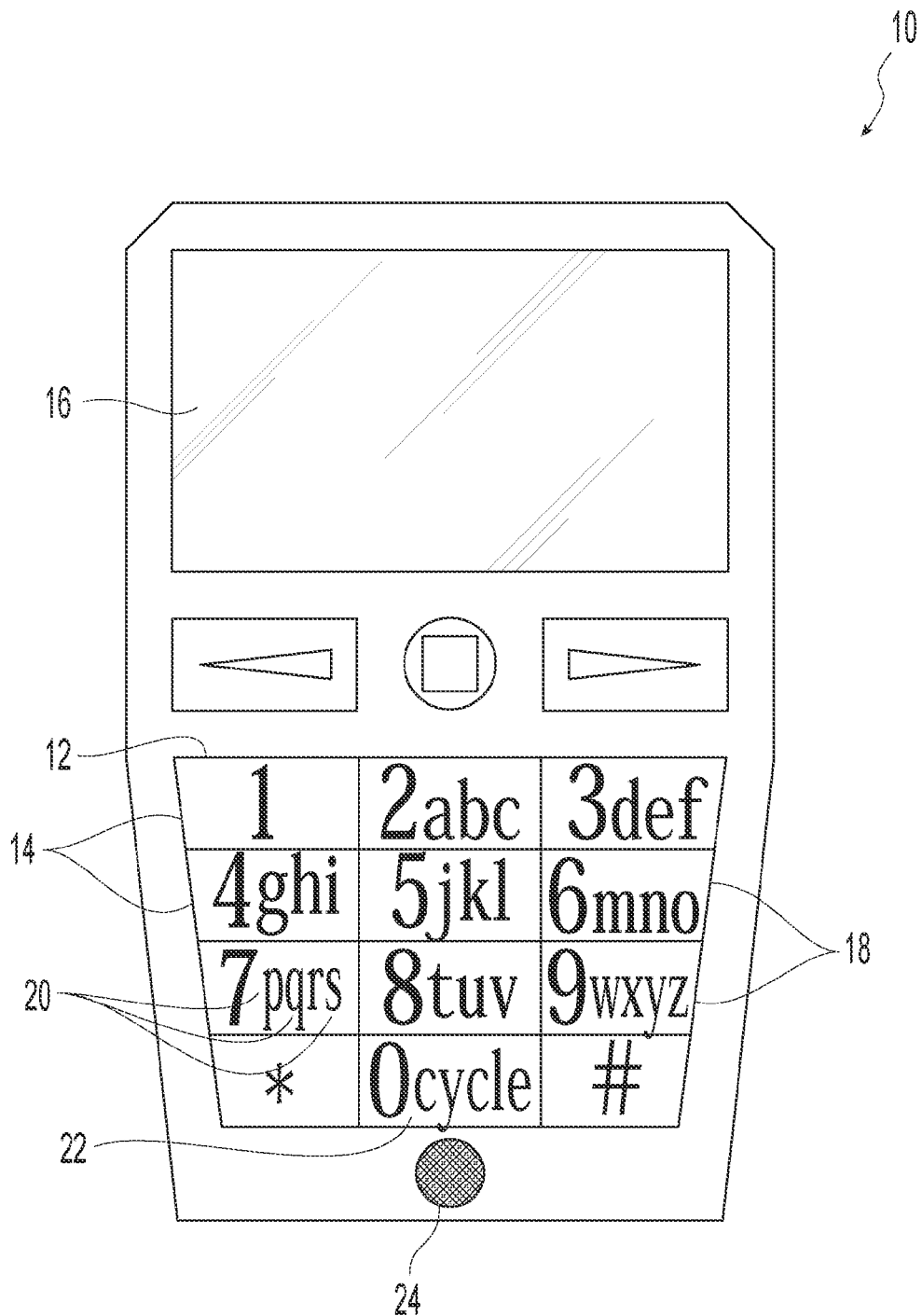
FIG. 1 is a front view of one embodiment of a text receiving apparatus according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a text receiving device 10 is illustrated as being a cellular telephone. While a cellular telephone is illustrated in FIG. 1 as the device 10, it is understood that any electronic communication device into which text can be typed or inputted is within the scope of the present invention. Such devices include personal digital assistants (PDAs), portable email devices, smart phones, computers, etc. The device 10 preferably includes a reduced key pad 12 with a plurality of keys 14 by which a user can operate and control the device 10. The device 10 also includes a display 16 that can display text that is inputted by the user of the device 10 as well as text received by the device 10. Depending upon the type of device 10, the display 16 may also display other information, including for example videos, pictures, etc.

The plurality of keys 14 also include a number of letter keys 18 that have letters 20 assigned to the letter keys 18. The letter keys 18 typically all have at least two letters 20 assigned to a single letter key 18, but some of the letter keys 18 may have only a single letter assigned to a single letter key 18, or possibly two or more letters assigned to a single letter key 18. As illustrated in FIG. 1, the letter keys 18 (those corresponding to numerals two through nine) each have at least three letters assigned to each of the letter keys 18. The letter keys 18 corresponding to the numerals seven and nine each have four letters associated thereto (p,q,r,s being associated with the numeral seven key and w,x,y,z being associated with the numeral nine key). The device 10 may also have other keys 14, such as the numeral one key, that do not have any letters associated therewith. In a preferred embodiment, there is at least one key having a cycle function associated therewith. As illustrated in FIG. 1, the zero key 22 of device 10 has the cycle function associated therewith. As described in more detail below, the cycle key 22 causes the next letter associated with a letter key 18 to be displayed. For example, when a user would like to input the letter "b," the user would press the numeral two key (having letters a,b,c associated therewith), and the device 10 which would then display the letter "a." The user would then press the zero key 22 to cycle through the letters associated with the previously pressed key. In this example, pressing the zero key 22 would change the "a" to the letter "b." If the user were to press the zero key 22 again, the letter "b" would then change to the letter "c," and if the zero key 22 were pressed yet again, the letter "a" would be displayed since it was the next letter that would follow in the order of letters associated with the letter key 18.

Similarly, the letter keys 18 may have more or fewer letters assigned thereto. For example, each of the letter keys 18 may have only two letters assigned thereto, or even have four or more letters assigned to each of the letter keys 18 and still come within the scope of the present invention.

The device 10 may also have other keys that are used to control the device 10 and to input other information, e.g., the numeral keys 14 or even soft keys that could appear on the display 16. The device 10 may also have a microphone 24 to input information into the device or to be used with the telephone portion of the device 10, if so equipped.

In a preferred embodiment of the present invention, the device 10 will suggest a letter for a word being typed by a user into the device 10 based when a letter key 18 is pressed. For example, if a user wanted to type the word "hello," the user first would press the numeral four key on device 10 as illustrated in FIG. 1 (which has the letters g,h,i associated therewith). As noted above, the letter "g" would appear on the display 16 since it is the first letter associated with the numeral four key. The user would then press the zero key (or the key assigned to be the cycle key), causing the letter "h" to then be displayed on the display 16. To continue typing the word "hello," the user would then press the numeral three key, which has the letter "e" associated therewith. However, the first letter associated with the numeral three key is the letter "d" and the letter combination "hd" as the first two letters in a word is nonsensical. According to the present invention, the device 10, as described in more detail below, recognizes that the most appropriate letter to be displayed on display 16 when a user presses the numeral three key on device 10 after the letter "h" is inputted is the letter "e" and not "d" or "f," the other letters associated with the pressed key.

The present invention uses rote default letters for the first letter in a new word, and the user, after some experience, becomes skilled in the use of the cycle key in order to arrive at the desired first letter of any given word. As noted above, when the user wanted to type the word "hello," the cycle key 22 had to be pressed once after the numeral four key was pressed to correctly input the letter "h." If the user wanted to type the word "ice," the user would have to press the numeral four key and then the cycle key twice to display the letter "i," thereby moving from "g" to "h" and then finally to "i."

In order to predict letters that user intends to type into device 10 (and after a first letter is correctly inputted into the device by the user), a method is used that preferably relies upon a data set of weighted positional digrams. As noted above, a digram is a two letter sequence of consecutive letters in a word. For example, in the word "hello," there are four digrams: "he"; "el"; "ll" and "lo." The four digrams in hello can be referred to by their position in the word. The digram "he" is in the first position, while the digram "el" is in a second position, and so on. Thus, the four digrams in "hello" can be represented as "1he," "2el"; "3ll" and "4lo," respectively.

Figure 2:
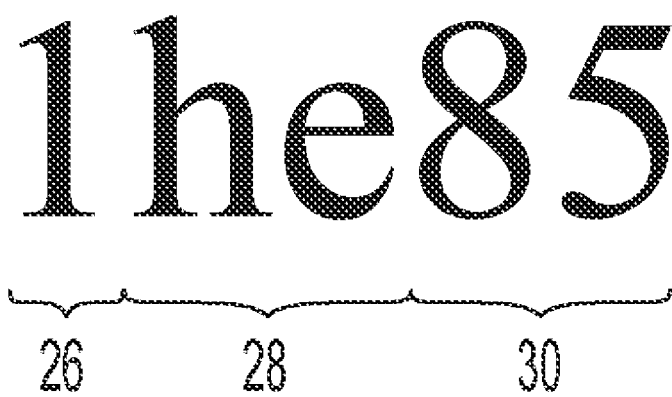
FIG. 2 illustrates a weighted positional digram according to one embodiment of the present invention.

A set of digrams can be synthesized from a large number of words in a text sample. This set of digrams can then be analyzed by weighting each of the digrams based on their position in a word and the relative frequency of each digram within a given language. For example, if the digram "he" appeared in the first position in a text sample 85 times, the diagram can be conceptually represented as "1he85", with the "1" representing the position in a word, the "he" representing the diagram and the 85 representing the number of times that the letter combination appeared in the text sample. Such a weighted positional digram is illustrated in FIG. 2, showing the position 26, the letters 28, and the weighting 30 of the digram in a particular text sample. The higher the number of times that a letter combination appears in the text sample in a particular position in a word, the higher the probability that the particular letter combination will be correct in any given word being typed. Generally, the weighting is used when there are two different letter combinations possible given a single key being pressed. For example, when the letters "n" and "o" are entered and then the numeral seven key is pressed (having p, q, r, and s assigned thereto), the letters "p" and "s" are both logical possibilities—for "nope" or "nose," among other possibilities. Therefore, the program would check for the weightings of "2op" and "2os" (2 because the positioning of the digram is in the second position in the word) and provide either the letter "p" or "s" depending on the higher weightings.

Figure 3:
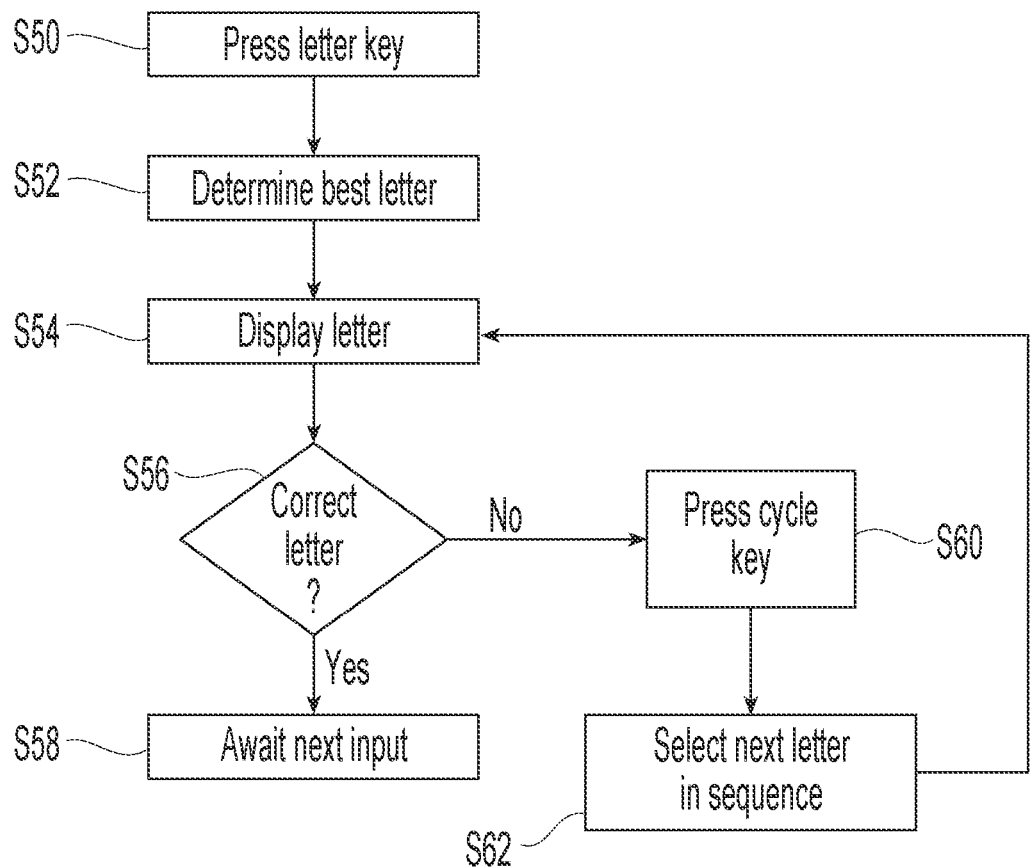
FIG. 3 illustrates one embodiment of a method of predicting text using weighted positional digrams according to the present invention.

One method of predicting text according to the present invention is illustrated in FIG. 3. At step S50, a letter key 18 on the device 10 is pressed by the user. At step S52, the present invention will determine the best letter associated with the pressed letter key 18 to display on display 16. If it will be the first letter in a word, the present invention will determine that the first letter associated with the pressed key 18 is the letter to display at step S54. If the letter is not the first letter in the word, the present invention, having a list of weighted positional digrams, will consult the weighted positional digram list to determine which letter associated with the pressed letter key 18 would be most reasonable to display on display 16 at step S54 with the previously entered letter. The user determines at step S56 whether the displayed letter is the correct letter for the word the user has in mind. If the correct letter has been input, the present invention, at step S58 awaits the next input. If the letter was not the correct letter at step S56, the user presses the cycle key at step S60 and the next letter in sequence on the previously selected letter key 18 is selected at step S62, which then appears on the display 16 at step S54, when the user can again determine at the next step S56 if the letter is correct. This can then be repeated until the word is finished.

In another embodiment of the invention, only the relatively highly-weighted digrams would be stored in the list. As an example, if "ca" is found more frequently at the beginning of a word than "cb" or "cc", then "ca" could be stored so that the recommended letter would be "a" if the "2" key is activated following the selection of the letter "c" at the beginning of a word. Values for "cb" or "cc" in relation to the first position within a word would not be stored if "ca" is stored as the best digram choice at that word position. Such a process recommends the most statistically likely letter and at the same time minimizes the amount of data that needs to be stored. Thus, the digrams that were statistically ruled out would be discarded from the end-user application.

Additionally, there are instances where, in any given language, there are certain words and groupings of letters in words that seemingly follow the same pattern regardless of where they are in a word. These may be two-, three-, or four-letter combinations (multi-grams) of letters that follow strong linguistic rules. For example, the letter "q" is usually followed by the letter "u", so when the letter "q" has been entered and the numeral eight key (TUV) is pressed, the letter "u" should be displayed. Similarly, when the letters "tt" are input by the user and the numeral four key (GHI) is pressed, the letter "i" should be displayed as the mostly likely choice. A list of such multi-grams can also be used to determine the next letter in the word being entered by the user.

In an alternative embodiment of the present invention, trigrams rather than digrams can be used to determine the next letter in the word being typed. The list of trigrams would be determined in the same manner as the digram list described above. The trigrams would be stored in a dataset in a similar manner to the manner that digrams are stored. As noted above with respect to the digrams, in a preferred embodiment only those trigrams having the highest frequency at a particular position would be retained for use with device 10. As an example, if "cat" is found more frequently at the beginning of a word than "cau" or "cav", then the trigram "cat" would be used as the best linguistic choice (where "c" and "a" have been input and the numeral eight key is pressed) and both "cau" and "cav" could be discarded from the stored list due to being ruled out statistically at a particular position within a word.

Similarly, according to another alternative embodiment, quadgrams rather than digrams may be used. Again, the quadgrams would be determined and stored in a similar manner to the way that the digrams or the trigrams are determined and stored. Any quadgrams that were ruled out due to their relative infrequency could also be discarded from the end-user application. So, for example, if "cate" is found more frequently at the beginning of a word than "catd" or "catf", then only "cate" would be stored for use with device 10 when the numeral three key is pressed.

Figure 4:
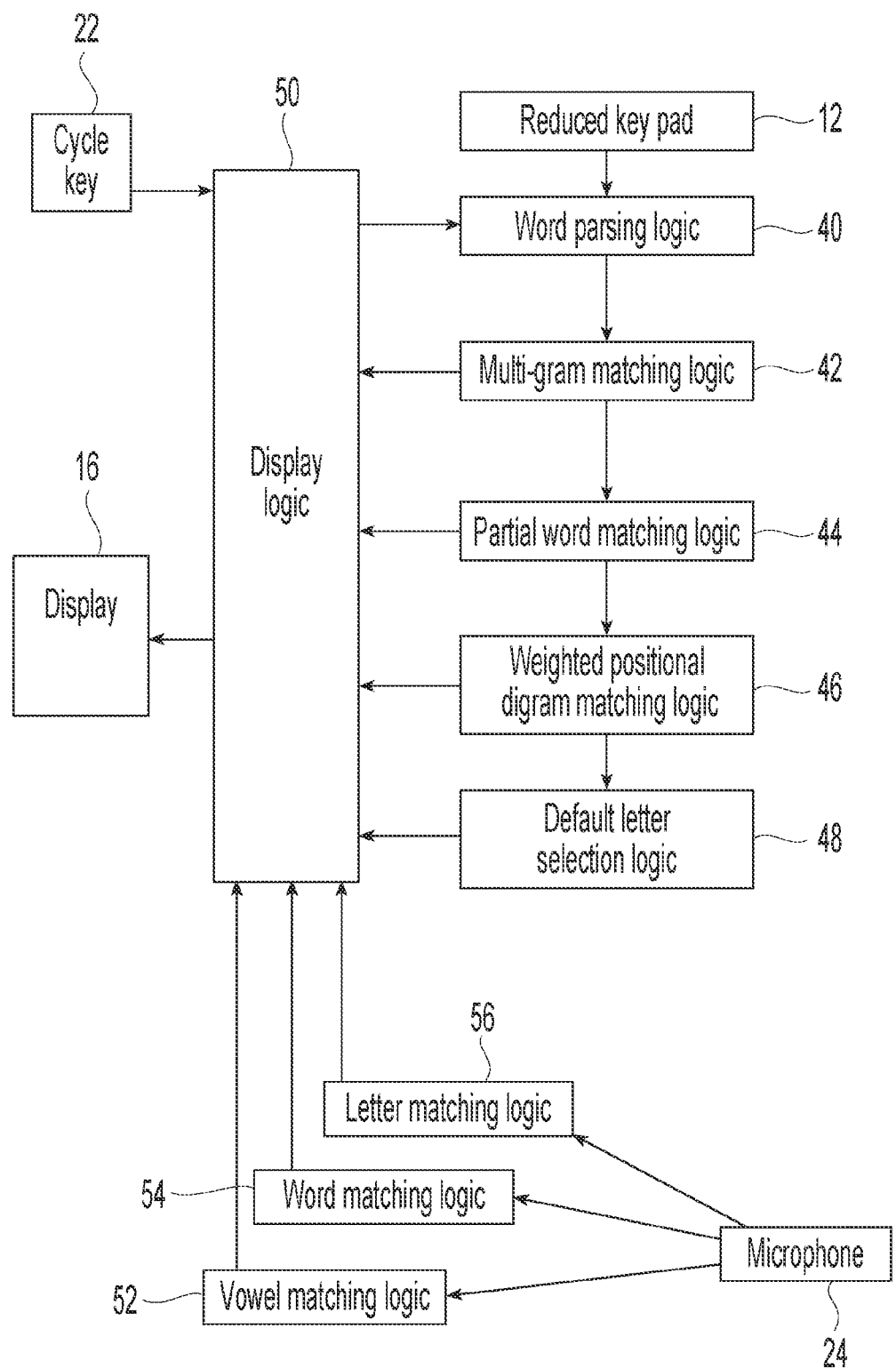
FIG. 4 illustrates the logic modules according to another embodiment of the present invention.
Figure 5:
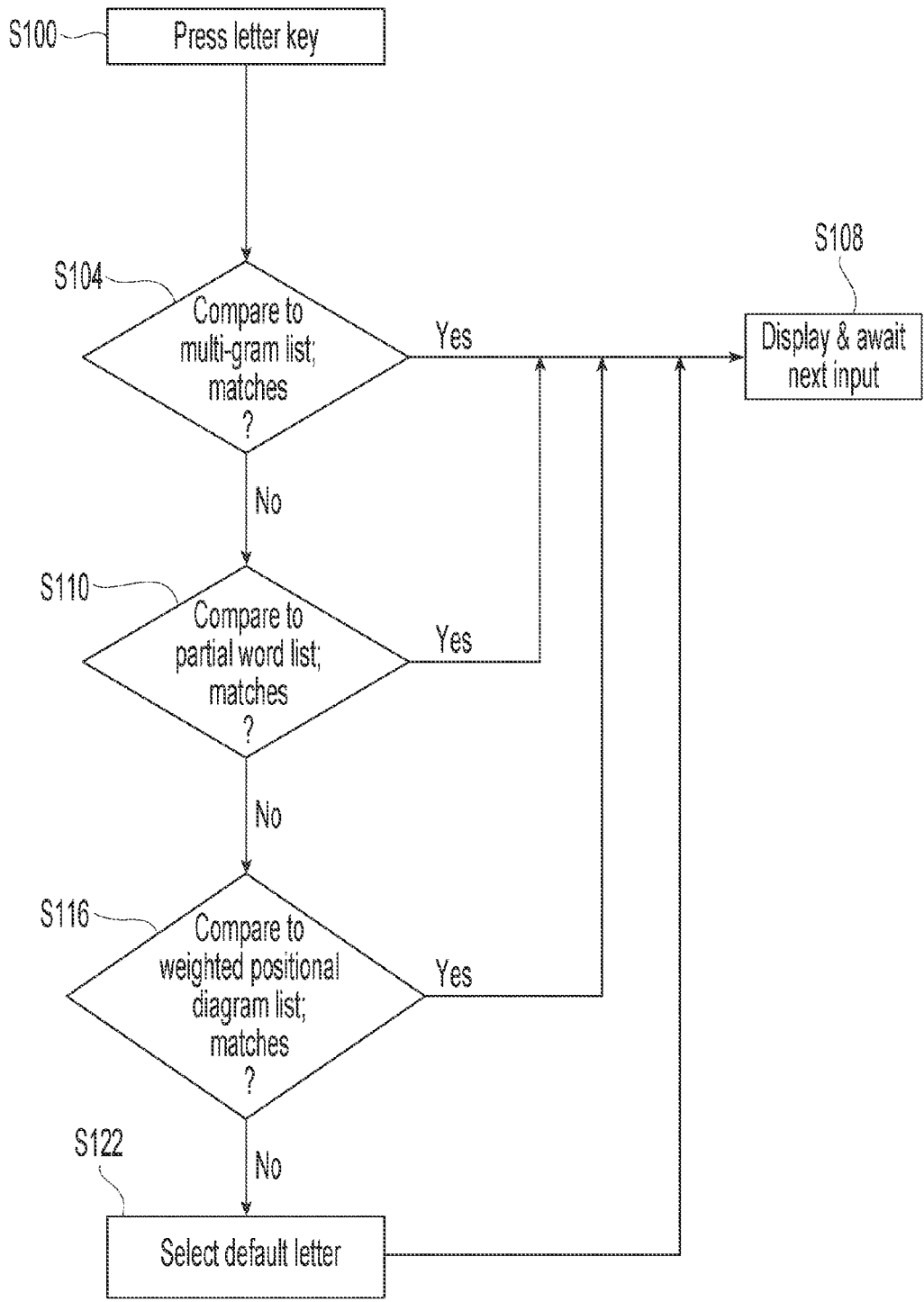
FIG. 5 illustrates a simplified flow chart describing a method of predicting text according to the present invention.

A more complex method of using the aforementioned lists in predicting letters in a word being typed is described in conjunction with FIGS. 4 & 5. A user presses or otherwise activates a key on a reduced keypad 12, such as one of the keys 14 or a soft key (such as a backspace key), on device 10 at step S100. The information associated with the key pressed by the user is received by word parsing logic 40 (available to the device 10), which then determines the positional information of the entered information (whether it is a letter or punctuation) in relation to a given word being input by the user. If the user presses the space key followed by a character key, then the word parsing logic 40 will normally determine that the user has begun keying a new word into device 10. It should be noted that the pound (#) key might be the space key in a one embodiment, while in a different embodiment the star (*) key may be the space key. Additionally, one of the soft keys on a cell phone can be used as the backspace key. All of these embodiments come within the scope of the present invention. Similarly, if the user presses a punctuation key (typically the numeral one key by modern convention) and selects the period, or cycles to another end-of-sentence punctuation symbol such as the exclamation point and then selects the space key, then the word parsing logic 40 generally determines that a new sentence is beginning. The word parsing logic 40 outputs information involving the characters of the word entered thus far and the identity of the key just activated. The word parsing logic 40 is responsible for keeping track of the sequence of letters in a word, particularly when the user presses the backspace key once or multiple times.

Information associated with the key pressed by the user (and any previously entered letters) are then compared to a list of multi-grams in the multi-gram matching logic 42 at step S104 to determine if there are any matches. For example, if the English language letter "q" was previously chosen by the user and then the numeral eight (TUV) key was pressed, then the letter "u" would always be passed to display logic 50 and displayed on display 16 to await the next input from the user at step S108. As another example, if the English language letters "tt" were chosen by the user and then the numeral four (GHI) key was pressed, then the letter "i" would always be passed to display logic 50 and displayed on display 16.

If no match is found by the multi-gram matching logic 42 at step S104, then program control passes to step S110 where the inputted letters are compared to a list with partial word matching logic 44. Partial word matching logic 44 determines if the letters of the word entered thus far in conjunction with the identity of the key just activated by the user can be matched with the partial word list. For example, if the letters of the word entered so far are "biti" and the most recent key pressed was the numeral six key (having m, n, and o associated with it), then the letter "n" would be passed to display logic 50 and displayed on display 16 to await the next input from the user at step S108. Partial word matching logic 44 is the logic that assists with all of the words that are exceptions to the rules associated with the weighted positional digram matching logic 46.

The partial word matching list used by partial word matching logic 44 is preferably determined after the list of digrams is derived from the text sample. Words can be tested against the digrams to determine which words will not be spelled correctly using the logic associated with the weighted positional digrams alone. The testing is typically done by a computer and the generated list of partial words may be different (even slightly) depending on the text sample used to create the digram list and the partial word list.

Partial word matching logic can be used to supplement the weighted positional digram logic and the multi-gram matching logic. The combination of these different techniques helps accomplish the goal of a highly-effective form of text prediction while also minimizing the need for data storage.

For example, if the word "bird" was compared with the statistically-generated digrams, "d" may not be the letter that would be suggested according to the digram list to follow the letter "r" in the fourth position when the possible choices are those on the numeral three key (d, e, and f). Thus, according to the present invention, when the word portion "bir" has been entered and the numeral three key is pressed, the letter "d" would be suggested as a result of the partial word matching logic.

As another example, if the word "bridge" was compared with the statistically-generated digrams, "g" may not be the letter that would be suggested according to the digram list to follow "d" when the numeral three key is pressed. Thus, according to the present invention, when the word portion of "brid" has been entered and the number four key is pressed, the letter "g" would be recommended.

Finally, if the word "design" was compared with the digram list, "n" may not be the letter that would be suggested when the numeral six key is pressed. Thus, according to the present invention, when the word portion "desig" has been entered and the numeral six key has been pressed, the letter "n" would be recommended.

If a match is not found at step S110 by partial word matching logic 44, then control passes to the weighted positional digram matching logic 46 at step S116. Using the weighted positional digram list, the weighted positional digram matching logic 46 checks for a positional digram that matches the most recently chosen letter, the positioning information, and the identity of the key just activated. So, for example, if the most recently chosen letter was "c" and was in the third letter position within the word and the identity of the key just entered is numeral eight key (having t, u, and v associated with it), then (depending upon the information stored in the weighted positional digram listing) the letter "u" would be passed to display logic 50 and displayed on display 16 to await the next input from the user at step S108.

If no match has still been found at step S116, then program control is passed to default letter selection logic 48 at step S122 and the default letter is displayed. In a one embodiment, the default letter selection logic 48 chooses the first letter on a pressed key as the first letter of a given word for purpose of consistency, regardless of whether it is the statistically most likely letter to begin a word. However, any of the associated letters with the respective keys may be provided as the default letter. The user determines if the letter provided by the default letter selection logic 48 is correct. If not, the user then presses or activates the cycle key 22 (which may be the next input illustrated in step S108) until the desired letter is displayed.

Default letter selection logic 48 may choose the most statistically-likely character if the program logic determines that some letter other than the first letter of a word is needed. For example, if the numeral seven key (having p, q, r, and s associated with it) has been activated, then the "s" letter may be the default letter passed to display logic 50 for any other letter of a given word except the first letter of that word.

As illustrated in FIG. 4, display logic 50 also receives input from voice recognition logic, such as optional vowel matching logic 52, and from optional word matching logic 54 and from optional letter matching logic 56. These optional features and the means by which the user turns these optional features off or on, such as a menu option, may or may not be provided.

Optional vowel matching logic 52 matches sounds received through the microphone 24 with vowel match rules. For English language users, for example, the vowel match rules would preferably include "a", "e", "i", "o", and "u". The preferred embodiment excludes the letter "y" because it sounds so much like "i". When optional vowel matching logic 52 is switched on, then it is activated when the user speaks and it recognizes a vowel. Thus, the user can alternate between keying consonants or numbers and voicing vowels.

Optional word matching logic 54 matches sounds received through the microphone with word match rules. For English language users, for example, the word match rules would typically include a set of the most frequently occurring words, such as "he", "she", "it", "them", "the", "a", "in", etc. The experienced user would have memorized many or all of the words in this set and would voice them and activate keys to enter the less-frequent words.

Optional letter matching logic 56 would use letter matching rules for purpose of character correction only. So, for example, if the user activates the numeral two key (ABC) and the "a" is shown on display 16, then the user could speak the letter "c", and optional letter matching logic 56 would determine that the letter "c" was the only letter found on the numeral two key (having a, b, and c associated with it) that could have been intended. It would automatically exclude the letter "a" from consideration, since the user would have no need to speak a letter if the user was satisfied with the letter already displayed on display 16.

Figure 6:
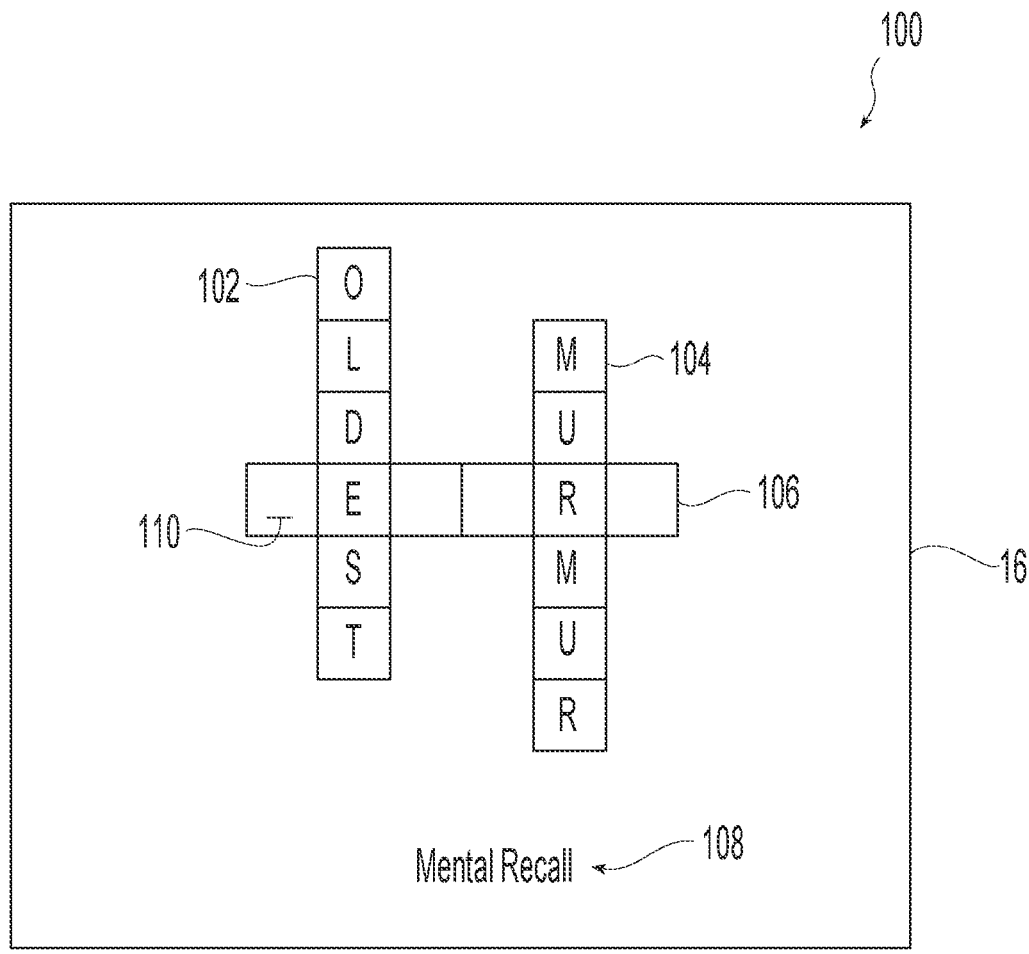
FIG. 6 is a screen shot of a crossword puzzle game according to one embodiment of the present invention
Figure 7A:
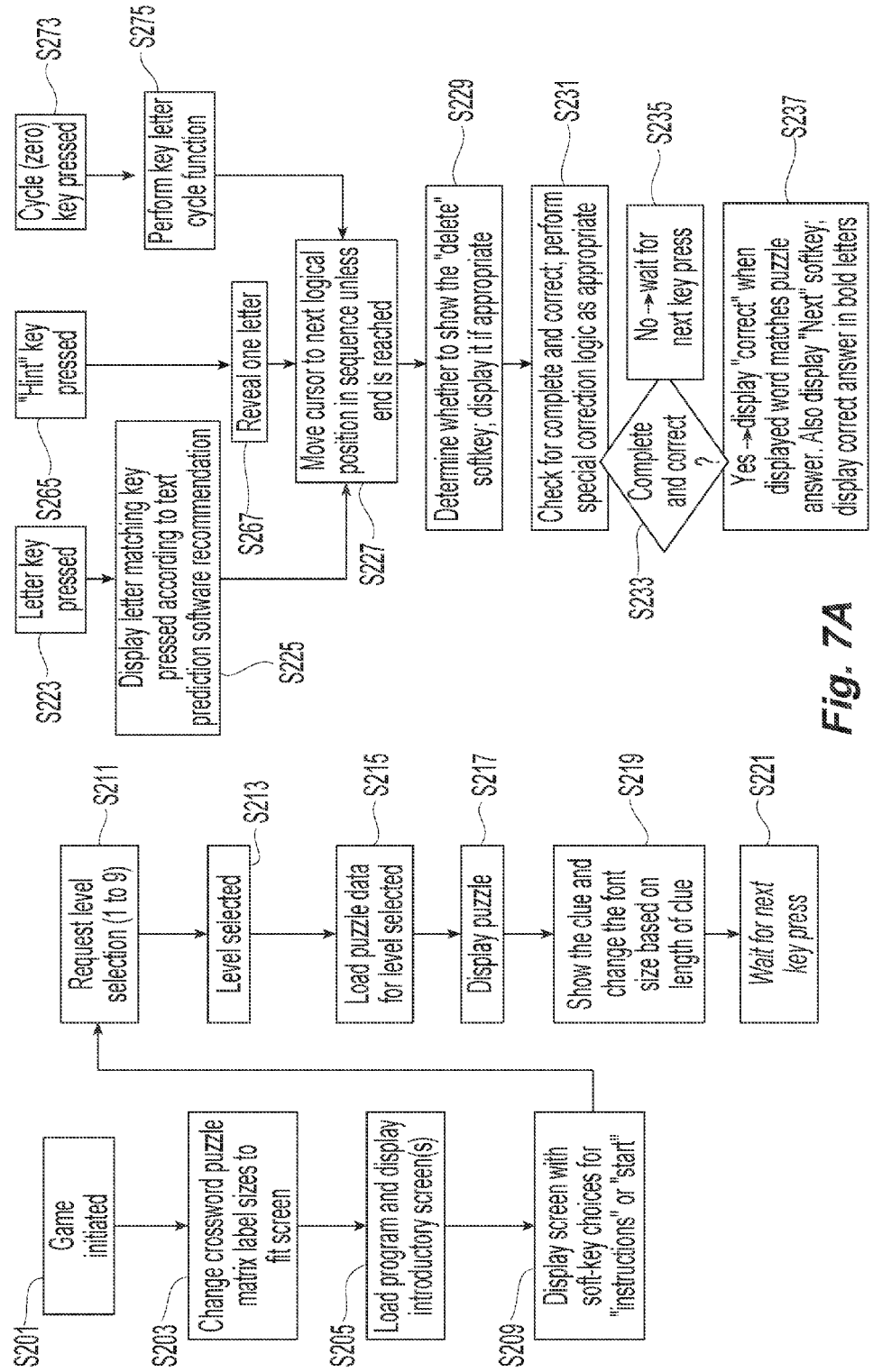
FIGS. 7A and 7B are functional diagrams for the crossword puzzle game according to one embodiment of the present invention.

Another embodiment according to the present invention is illustrated in FIGS. 6 and 7. In this embodiment, a crossword puzzle 100 is illustrated on the display 16 of the cell phone 10 in FIG. 5. The crossword puzzle 100 is illustrated in display 16 of FIG. 6 as two vertical columns 102, 104 and one horizontal row 106. In the illustrated embodiment, completed words are displayed in the two vertical columns 102, 104, while the incomplete word is in a horizontal row 106. A clue 108 is preferably displayed at the bottom of display 16, but may be displayed anywhere in display 16. A cursor 110 is also provided in the first open space in the incomplete word. Rather than using a cursor 110 to mark a position for entering text into the crossword puzzle 100, this cell may show a question mark, have a different color background, or may be a blinking cursor to indicate to the user where a letter will be input into the crossword puzzle 100.

It should be noted, that rather than having the incomplete word in a horizontal row, the crossword puzzle may also be arranged such that the incomplete word is in a vertical column. Additionally, while two vertical columns and one horizontal row are illustrated in FIG. 5, any appropriate numbers of vertical columns and horizontal rows may be displayed and still fall within the scope of the present invention. For example, the portion of the crossword puzzle 100 may have two horizontal rows joined by one vertical column, with the incomplete word in the vertical column. The numbers of horizontal rows and vertical columns are generally dictated by the size of the display on the device.

The operation of crossword puzzle 100 will now be described with reference to FIG. 6. At step S201 the crossword puzzle game is initiated on the cell phone 10 or other appropriate electronic device. At step S203, the portion of the crossword puzzle 100 is appropriately sized for the size of the display 16. Then at step S205 the program is loaded and any introductory screens are displayed on the display. In final preparation for beginning to play the crossword puzzle 100, two soft key choices are preferably displayed on the display to provide the user/player with the option of reading instructions or beginning play at step S209.

Figure 7B:
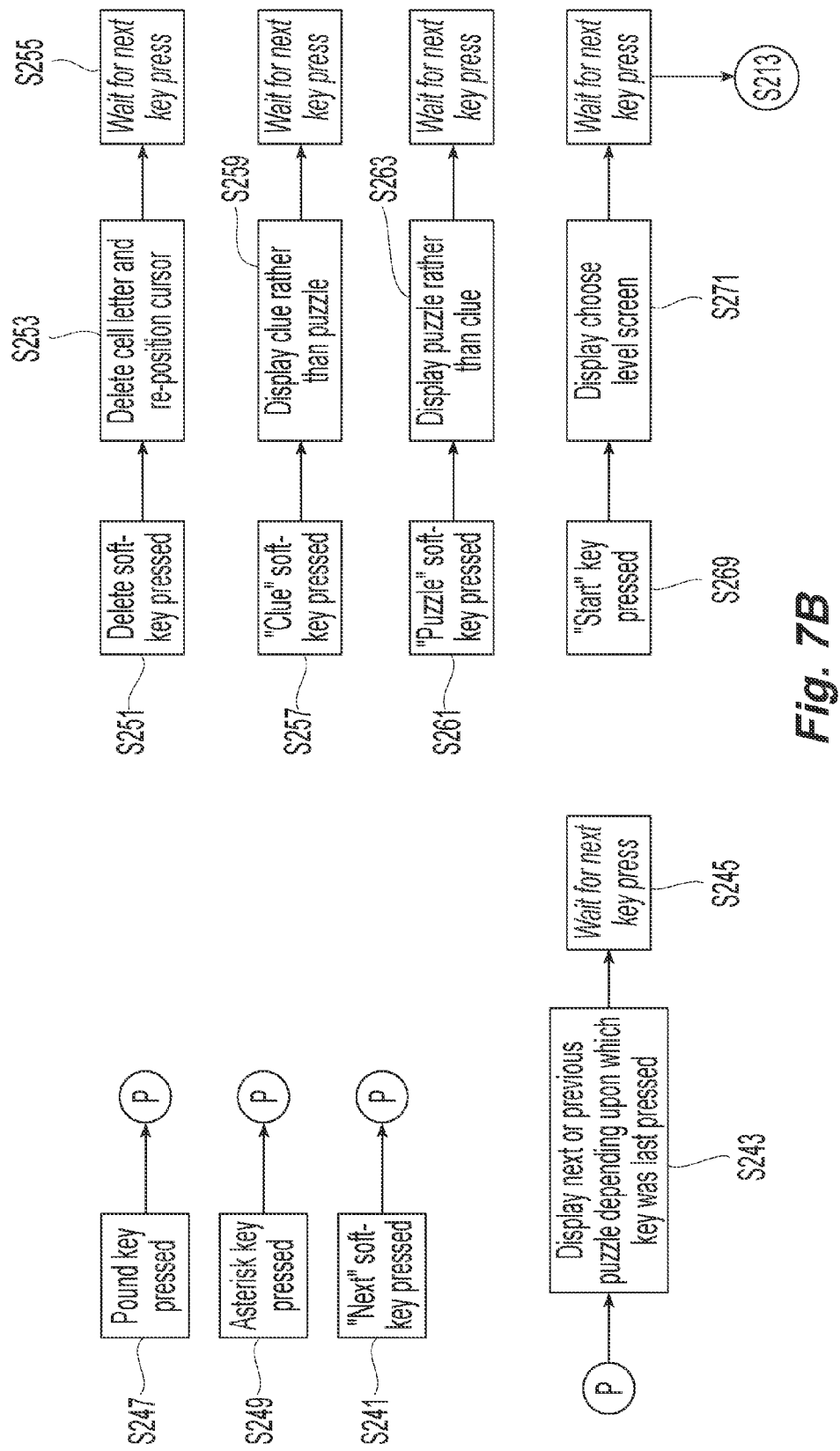

If the player has selected to start play at step S209, the player is asked to select a level of play at step S211. This is also true, as illustrated in FIG. 7B, that whenever a player has reached the end of all of the puzzle games in a particular level of play, the player is requested to select a level of play at step S271. The level of play is selected at step S213, the appropriate puzzle data for the level selected is loaded at step S215 and then the first puzzle is displayed at step S217. At step S219, the clue 108 is displayed on display 16 and, if required, the font size of the clue 108 is changed so that the clue 108 will be appropriately sized for display 16. At step S221 program waits for the user to press a key. At this point in the game, the cursor has been positioned in the first open position in the incomplete word in the crossword puzzle 100. The user would then typically press a letter key at step S223 (shown at top of FIG. 7A), which is then displayed in the crossword puzzle 100 at step S225. If the letter entered at step S223 is not the first letter in the incomplete word, then the text prediction software, as discussed above, will recommend the letter to be displayed on display 16. The program then moves to step S227, where the cursor moves to the next logical position, unless it is at the end of the word.

At step S229, it is determined if a soft key to delete a letter should be displayed, and if it should, it is then displayed. At step S231, the word is checked for completeness and to see if the word is the correct word for the crossword puzzle 100. There may be instances where the letters entered make sense and make a correctly-spelled word, but perhaps not the word that is best for the clue given. In a preferred embodiment, the program checks the word entered against the correct answer. For example, if the first three letters in the incomplete word are "WAL" and the clue is "To move", the correct answer would be "WALK." However, at step S225, the text prediction software may have determined that the correct letter to enter when the player pressed the numeral five key on cell phone 10 was the "L" because the digram "LL" is more probably than "LK" at the third position. However, "WALL" would be an incorrect answer to the puzzle, and at step S231 the game would override the text prediction and insert a "K" rather than the "L." Alternatively, the program could present the letter recommended by the text prediction software and the user could use the cycle key, knowing that the word "WALL" is incorrect, thereby changing the letter to the correct letter. The program determines at step S233 if the word is correct and complete. If not, then at step S235, it waits for a new key to be pressed. If yes, then at step S237, the correct word is preferably displayed in all bold letters (or some manner to highlight the word) and the word "CORRECT" is displayed in display 16. A soft key for NEXT is also displayed to allow the player to continue playing the game with another crossword puzzle.

If the NEXT soft key is pressed, as illustrated in FIG. 7B at step S241, the game moves to P, where the next game is displayed at step S243 and then the game waits for another key to be pressed at step S245, which is typically a letter to be put into the first open position of the next game. Similarly, as illustrated in FIG. 7B, the # key also moves the puzzle to the next puzzle at step S247, causing the program to move to P, where the next game is displayed at step S243. The * key causes the previous puzzle to be displayed. At step S249 in FIG. 7B, when the * key is pressed, step P is reached where the program logic determines that the prior puzzle should be displayed at step S243.

There are a number of other soft keys that may be displayed during the playing of the game. As noted above, a soft key for Delete may be displayed at step S229. If the program determines that the cursor is at the first letter of the word, then it will also determine that displaying the Delete key is unnecessary at this point in the game. If the user presses the Delete soft key displayed at step S251 as illustrated in the upper right portion of FIG. 7B, the letter previously entered will be deleted and the cursor will be moved back to the now open position in the incomplete word at step S253. At step S255, the program waits for the next key to be pressed, which is typically another letter key to insert a letter at the cursor position.

A "Clue" soft key may also be provided during the game to provide the clue for the word to be entered in the puzzle, particularly on those devices with small display screens. On those devices with small display screens, it is possible that only the puzzle or only the clue is displayed. Therefore, if Clue soft key is activated at step S257 as illustrated in FIG. 7B, the clue is displayed on the display 16 at step S259 rather than the puzzle. If the puzzle is to be again displayed, and the player presses the Puzzle soft key at step S261, then only the puzzle is displayed at step S263.

There are instances when the user may be stuck in the puzzle and need some assistance with the next letter to be entered. A Hint key may be provided and if the Hint key is pressed at step S265 as illustrated in the upper right portion of FIG. 7A, the next letter in the incomplete word will be displayed at step S267. The Hint key may be either a soft key or assigned to a numeral key, such as the numeral one key, depending on the device. The program then moves to step S227, where as noted above, the cursor moves to the next position.

Finally, there may also be a Start button that is provided to allow the person to start over or for someone new to try the game. The Start button is typically displayed at the bottom of the screen when the instructions are displayed at step S209. At step S269, the start button is pressed and at step S271, a request to choose the level to be played is displayed on the display 16. The program then waits for the player to press the level, which returns the program to step S213, and the appropriate puzzle data is loaded at step S215.

The crossword puzzle will also use the cycle key as described above. At step S273 when the cycle button is pressed, the next letter associated with the letter key that was pressed before the cycle key will be displayed at step S275. Typically, the cycle key will only be useful when entering the first letter in the incomplete word or when the letter predicting software has selected the incorrect letter as noted above.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of predicting letters in a word being typed comprising the steps of:
   a) considering a letter entered into a text receiving apparatus by a user by pressing a key on the text receiving apparatus, the text receiving apparatus having a plurality of keys to enter text and at least one of the plurality of keys having at least two letters assigned thereto;
   b) providing a partial word list, the partial word list having a predetermined number of portions of words and at least one following letter associated with each word portion, wherein each of the at least one following letters immediately follows each of the word portions and each of the word portions includes the first letter of each of the word portions;

c) comparing at least one letter previously entered into the text receiving apparatus with the partial word list;

d) suggesting only a single letter to the user, the single letter being the at least one following letter to be added to the at least one previously entered letter based on the partial word list and the pressed key.

2. The method of predicting letters according to claim 1, further comprising the steps of:
   a) providing a set of digrams, the digrams comprising two letter combinations, each of the digrams having assigned a weighted value representing a frequency of occurrence in a given word based on a location of the digram in the word being typed;
   b) considering the letter entered into a text messaging apparatus by a user by pressing one of the plurality of keys on the text receiving apparatus when the at least one previously entered letter entered into the text receiving apparatus is not present in the partial word list;
   c) suggesting a following letter that would come after the at least one previously entered letter from the list of digrams when one of the plurality of keys is pressed, the suggested following letter being based on the pressed key and also on a location of the at least one previously entered letter and the suggested following letter in the word and frequency of the occurrence of a resulting digram of the at least one previously entered letter and suggested letter in the location in the word being typed.

3. The method of predicting letters according to claim 2, further comprising the step of providing a key on the text receiving apparatus having associated therewith a cycle function, the cycle function causing the next letter associated with a previously pressed key to be selected for input into the text receiving apparatus when the cycle key is activated.

4. The method of predicting letters according to claim 2, further comprising the step of providing a microphone for orally entering a letter into the text receiving apparatus.

5. The method of predicting letters according to claim 4, wherein the orally entered letter alters the suggested following letter, the orally entered letter being assigned to the same key as the suggested letter.

6. The method of predicting letters according to claim 4, wherein the orally entered letter comprises only vowels.

7. The method of predicting letters according to claim 2, further comprising the step of providing a microphone for orally entering words into the text receiving apparatus, wherein the words being entered orally including a predetermined number of words.

8. The method of predicting letters according to claim 7, wherein the words being entered orally having no more than five letters.

9. The method of predicting letters in a word according to claim 2, further comprising the steps of: providing a set of predetermined number of multi-grams, the multi-grams having two letter and three letter combinations, and at least one following letter associated with each multi-gram; considering at least one previously entered letter by the user; suggesting the at least one following letter to be added to the at least one previously entered letter based on the pressed key and also on the at least one previously entered letter.

10. A method of predicting letters in a word being typed comprising the steps of:
    a) providing a partial word list, the partial word list having a predetermined number of portions of words and at least one following letter associated with each word portion, wherein each of the at least one following letters immediately follows each of the word portions and each of the word portions includes the first letter of the word;
    b) providing a set of digrams, the digrams comprising two letter combinations, each of the digrams having assigned a value representing a frequency of occurrence in a given word based on a location of the digram in the word being typed;
    c) considering at least one letter previously entered into a text messaging apparatus by a user, the text messaging apparatus having a plurality of keys to enter text and at least one of the plurality of keys having at least two letters assigned thereto;
    d) suggesting only a single letter to the user, the single letter being the at least one following letter to be added to the at least one previously entered letter of a word entered by a user based on the partial word list when the at least one previously entered letter of a word is present in the partial word list;
    e) suggesting a single following letter that would come after the previously entered letter from the list of digrams when the at least one previously entered letter is not present in the partial word list, the suggested following letter being suggested based on the pressed key and also on a location of the at least one previously entered letter and the suggested letter in the word and frequency of the occurrence of a resulting digram of the at least one previously entered letter and suggested letter in the location in the word being typed; and
    f) repeating steps c) through e) until the word is complete.

11. A method of predicting letters in a word being typed comprising the steps of:
    a) providing a set of digrams, the digrams comprising only two letter combinations, each of the digrams having assigned a value representing a frequency of occurrence in a given word based on a location of the digram in the word being typed;
    b) considering at least one letter previously entered into a text messaging apparatus by a user, the text messaging apparatus having a plurality of keys to enter text and at least one of the plurality of keys having at least two letters assigned thereto;
    c) suggesting a following letter that would come after the previously entered letter from the list of digrams, the suggested following letter being suggested based on the pressed key and also on a location of the at least one previously entered letter and the suggested letter in the word and frequency of the occurrence of a resulting digram of the at least one previously entered letter and suggested letter in the location in the word being typed; and
    d) repeating steps b) and c) until the word is complete.

12. A method of predicting letters in a word being typed comprising the steps of:
    1) performing a first check comprising the steps of:
       a) considering a letter entered into a text receiving apparatus by a user by pressing a key on the text receiving apparatus, the text receiving apparatus having a plurality of keys to enter text and at least one of the plurality of keys having at least two letters assigned thereto;
       b) providing a partial word list, the partial word list having a predetermined number of portions of words and at least one following letter associated with each word portion, wherein each of the at least one following letters immediately follows each of the word portions and each of the word portions includes the first letter of each of the word portions;
c) comparing at least one letter previously entered into the text receiving apparatus with the partial word list;
d) suggesting only a single letter to the user, the single letter being the at least one following letter to be added to the at least one previously entered letter based on the partial word list and the pressed key; and 2) if no match is found, performing a second check comprising the steps of:
a) providing a set of digrams, the digrams comprising two letter combinations, each of the digrams having assigned a weighted value representing a frequency of occurrence in a given word based on a location of the digram in the word being typed;
b) considering the letter entered into a text messaging apparatus by a user by pressing one of the plurality of keys on the text receiving apparatus when the at least one previously entered letter entered into the text receiving apparatus is not present in the partial word list;
c) suggesting a following letter that would come after the at least one previously entered letter from the list of digrams when one of the plurality of keys is pressed, the suggested following letter being based on the pressed key and also on a location of the at least one previously entered letter and the suggested following letter in the word and frequency of the occurrence of a resulting digram of the at least one previously entered letter and suggested letter in the location in the word being typed.

13. A method of predicting letters according to claim 12, wherein the second check is performed prior to the first check.

* * * * *